United States Patent [19]

Barker

[11] Patent Number: 5,361,972
[45] Date of Patent: Nov. 8, 1994

[54] PURGE STRAP FOR WELDING

[76] Inventor: Michael R. Barker, 4229 Barfield St., Concord, N.C. 28027

[21] Appl. No.: 994,111

[22] Filed: Dec. 21, 1992

[51] Int. Cl.⁵ .............................................. B23K 9/16
[52] U.S. Cl. .................................... 228/219; 219/74; 228/42; 228/49.3
[58] Field of Search ................. 228/57, 42, 214, 219, 228/49.3, 50; 219/74, 61; 428/920, 456, 458, 921; 24/546

[56] References Cited

U.S. PATENT DOCUMENTS

| | | | |
|---|---|---|---|
| 1,919,677 | 7/1933 | Young | 428/920 |
| 2,374,815 | 5/1945 | Haas, Jr. | 24/546 X |
| 2,805,316 | 9/1957 | Chapman | 228/219 X |
| 2,846,968 | 8/1958 | Tipton | 228/49.3 X |
| 2,981,824 | 4/1961 | Kitrell | 228/42 X |
| 3,496,002 | 2/1970 | Wolfes et al. | 428/458 X |
| 4,018,962 | 4/1977 | Pedlow | 428/921 |
| 4,018,983 | 4/1977 | Pedlow | 428/921 |
| 4,344,556 | 8/1982 | Knapp | 228/50 |
| 4,532,403 | 7/1985 | Jordan et al. | 228/214 X |
| 4,877,462 | 10/1989 | Sugita | 148/596 |
| 4,916,281 | 4/1990 | Flasche et al. | 219/74 |

FOREIGN PATENT DOCUMENTS

| | | | |
|---|---|---|---|
| 193298 | 8/1991 | Japan | 228/50 |
| 952952 | 3/1964 | United Kingdom | 219/61 |
| 2189177 | 10/1987 | United Kingdom | 228/49.3 |

Primary Examiner—Kenneth J. Ramsey
Attorney, Agent, or Firm—Ralph H. Dougherty

[57] ABSTRACT

An improved method and apparatus for shielding inert gas from seeping out of metal pipes in a welding application wherein a high-temperature resistant purge strap is placed around the weld gap and the pipe ends. Advantageously, the purge strap is equipped with a window to allow the welder access to the pipe ends. Dams may be inserted into each pipe near the end to be welded, the purge strap placed about the pipes covering the end of each, and inert gas pumped into the pipes, displacing the air within the pipes. A weld bead is laid into the gap and the purge strap is shifted around the circumference of the pipes to allow completion of the weld. The purge strap device is also disclosed.

21 Claims, 3 Drawing Sheets

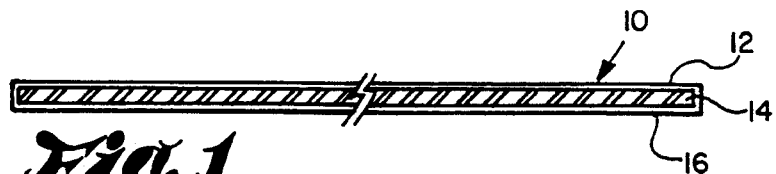
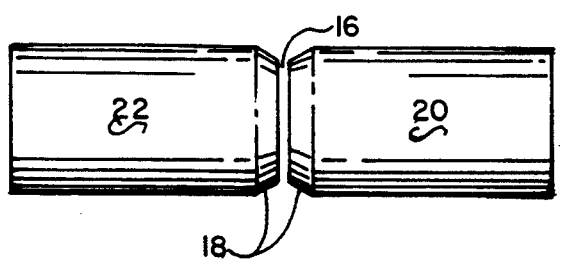
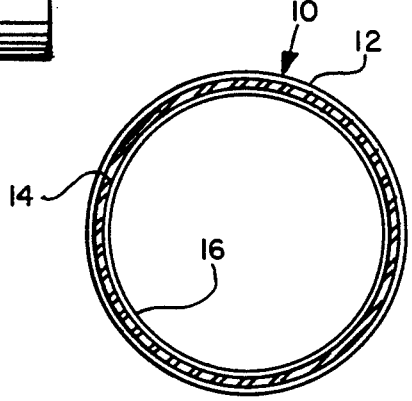
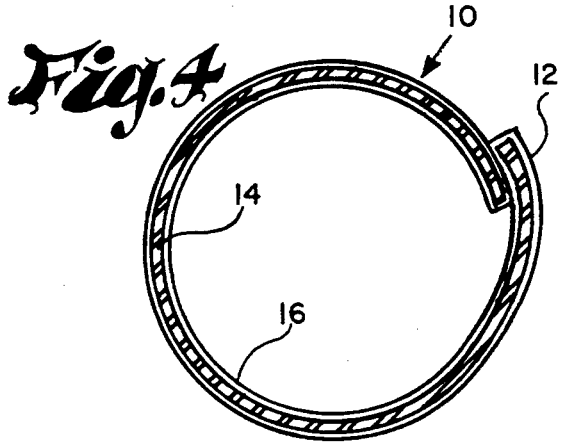
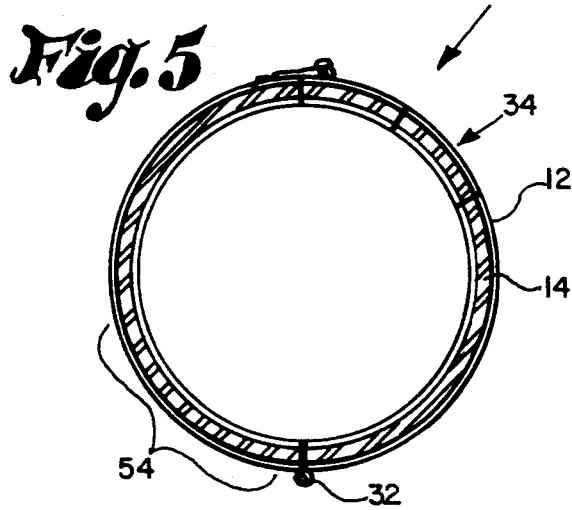
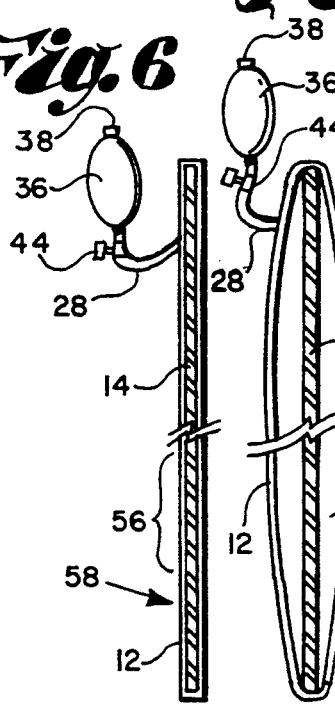

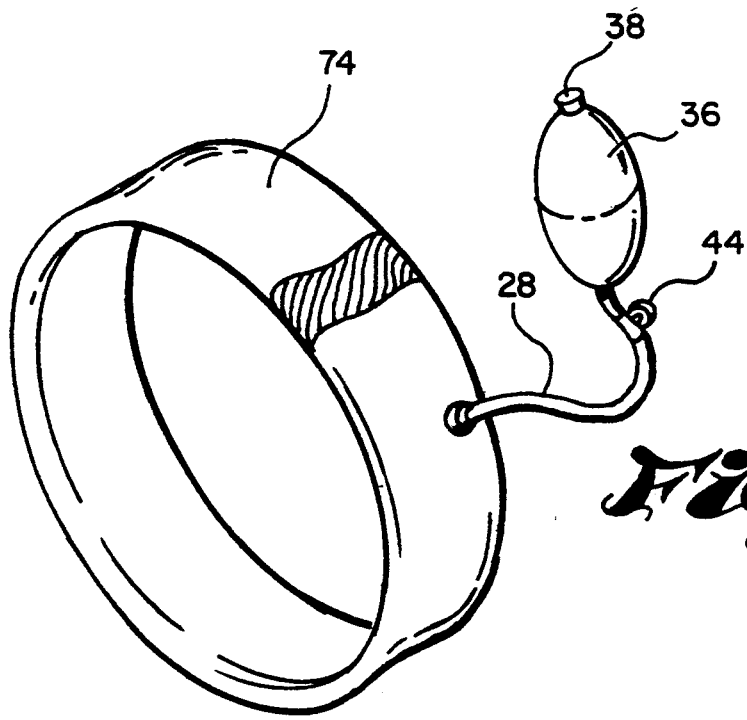
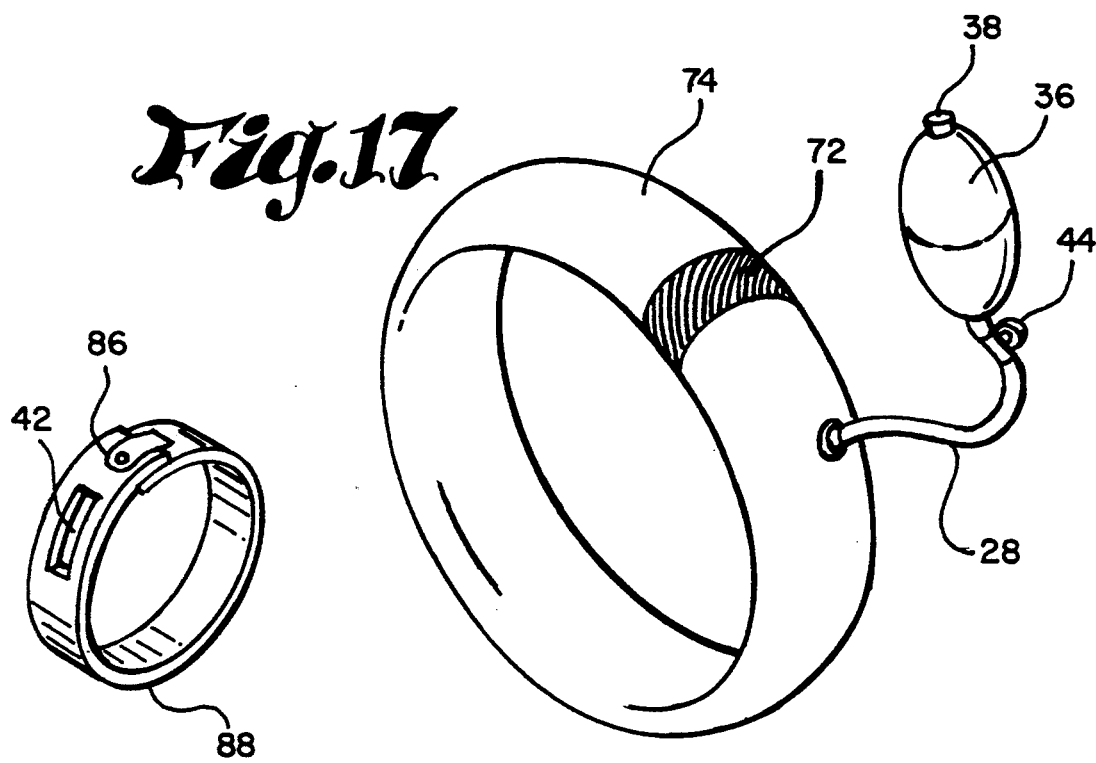

PURGE STRAP FOR WELDING

Field of the Invention

The present invention relates to a method and apparatus useful in the welding of pipe, and more particularly to apparatus and methods for shielding of pipe for the prevention of escape of inert shielding gas during welding.

BACKGROUND OF THE INVENTION

Gas Tungsten Arc Welding (often called TIG Welding) is an arc welding process in which the heat is produced between a nonconsumable electrode and the work metal. The electrode, the weld puddle, the arc, and adjacent heated areas of the workpiece are protected from atmospheric contamination by a gaseous shield. This shield is provided by a stream of gas (usually an inert gas), or a mixture of gasses. The gas shield must provide full protection; even a small amount of entrained air can contaminate the weld.

When two pipes are welded together, inert gas is injected into the pipes to prevent sugaring or oxidizing of stainless or chrome steel pipe. "Sugaring" is a term used in the welding industry to mean oxidation of the internal "root pass," the first layer of weld material introduced into the pipe weld. Oxidation of the "root pass" is caused by a lack of an inert gas to purge a pipe of oxygen. The high nickel and chromium content of the base metal becomes reactive with oxygen in the melting process of the weld. When purge gas is initially introduced to the interior of the pipe, a groove or gap between the two pipes to be welded together is left open to the atmosphere. Approximately 90 to 95% of the purge gas, the inert gas within the pipes, will escape through this gap between the ends of the pipes. The inert gas is then displaced by air which is rich in oxygen, which reacts with the chrome or nickel in the metal of the pipe itself, resulting in sugaring.

To combat this problem, welders commonly use masking tape or duct tape to inhibit the inert gas seepage through the gap in the pipes. In some applications, such as the construction of power plants, codes (ASME Pressure Vessel Code Sections 9 and 11) exist which require that the gaps between the pipes be blocked. A common means to accomplish this blocking is the use of masking or duct tape. However, there are problems associated with the use of tape. As the metal heats up, the masking tape or duct tape leaves an acidic residue which adversely affects the pipes. An inspector will require the welder to remove the residue. Two methods exist for removing residue. The pipes can be ground to remove the residue. This is an arduous and expensive process as it requires both time and labor. Alternatively, a welder can remove the residue with acetone. While the use of acetone is a simpler process, the risks involved with acetone are great. Acetone has a low flash point, whereas the temperature of the arc on a TIG welder is significantly more than 1500° F. Thus, the use of acetone on the cooling metal could have catastrophic repercussions. There exists a need for a shield which will inhibit the flow of inert gas from the interior of the pipes to be welded, without leaving a residue on the pipes.

Description of Related Art

Applicant is aware of the following U. S. Patents concerning inert gas shielding for TIG welding.

| U.S. Pat. No. | Inventor | Issue Date | Title |
| --- | --- | --- | --- |
| 3,652,818 | Erlandson | 03-28-1972 | INERT ATMOSPHERE SEAM WELDER |
| 3,736,400 | Speigel | 05-29-1973 | APPARATUS FOR DAMMING PIPE ENDS FOR WELDING |
| 4,354,088 | Rehrig | 10-12-1982 | GAS SHIELDED WELDING TORCH |
| 4,828,160 | Sundholm | 05-09-1898 | APPARATUS TO BE USED WHEN WELDING PIPES TOGETHER |
| 4,912,293 | Mueller | 03-27-1990 | METHOD AND APPARATUS FOR FORMING A PARTIAL PROTECTIVE-GAS ATMOSPHERE |
| 4,912,299 | Oros | 02-27-1990 | GAS METAL ARC WELDING OF ALUMINUM-BASED WORKPIECES |
| 4,916,281 | Flasche | 04-10-1990 | GAS BACK-PURGING DURING WELDING OF PIPE |

Erlandson U.S. Pat. No. 3,652,818 teaches resistance seam welder apparatus for welding lapped sheet material, particularly can bodies. The apparatus includes means for effecting inert gas flow between roller electrode surfaces and the interface of the lapped can body edge portions. The flow effecting means being is a manifold into which inert gas is introduced, while flexible sealing means are provided for sealing contacting opposite surfaces of the can body edge portions. This apparatus differs substantially from the present invention. The cans are welded lengthwise and not around the perimeter of the can. Because of the direction of the Erlandson weld, an inert gas environment can be created around the weld spot without having to inject inert gas into the can. Therefore, the shielding in Erlandson is substantially different from that of the present invention.

Speigel U.S. Pat. No. 3,736,400 teaches a method and apparatus for welding together a pair of pipe ends. The method comprises providing a water soluble dam at each pipe end, and inserting an inert gas into the end between the dams, then welding the ends together, followed by passing a fluid containing water through the pipe to dissolve the dam. Speigel's teaching regarding use of the water soluble dams is incorporated herein by reference. However, the Speigel patent provides no means for preventing inert gas seepage from the interior of the pipes through the gap between the two pipes which are to be welded together.

Rehrig U.S. Pat. No. 4,354,088 teaches a TIG welding torch head apparatus which directs inert gas flow around the tip of the torch. This torch head design provides additional inert gas shielding, however it does not inhibit the exodus of the inert gas from the gap between the two pipes.

Sundholm U.S. Pat. No. 4,828,160 teaches an apparatus for shielding the inert gas inside pipes by use of a bellows structure, which can be pulled through the pipe and reused. This apparatus, like that of Speigel, contains the inert gas within the pipe. However, it does not prevent the inert gas from escaping through the gaps between the two pipes to be welded together.

Mueller U.S. Pat. No. 4,912,293 teaches apparatus for creating a partial protective gas atmosphere for two tubes which includes a sheath brought to the welding location through one of the tubes or through the opening of the tube in the wall of the vessel. Both of the tube ends are overlapped with the sheath or one of the tube ends overlaps with the sheath and the sheath is placed above the opening in the wall of the vessel for the other tube. This forms a chamber about the welding location. The two tube ends are subsequently pushed together toward each other until only a slight intermediate space remains therebetween. A protective gas is introduced into the chamber through the intermediate space. the tubes then are centered in the desired position for welding.

Oros U.S. Pat. No. 4,912,299 discusses the need for shielding gas, however it does not teach any means for containing the shielding gas in any given area.

Flasche U.S. Pat. No. 4,916,281 teaches a method of welding in which inert gas flows out from a pipe interior about the weld area. To accomplish this, the patentee suggests that the weld joint should be sealed around the circumference of the pipe except for a small opening at the top position of the pipe. However, Flasche teaches no method for sealing the joint, and one can only assume masking tape or duct tape is employed to accomplish this purpose.

SUMMARY OF THE INVENTION

The present invention is a shield apparatus, or purge strap, having a circular configuration. The shield fits around the tapered ends of two abutting pipes to be welded end-to-end to prevent the seepage of inert gas which has been injected into the pipes from the interior of the pipes. Once the weld bead is laid down along a section of the abutting pipe ends, part of the weld shield is moved aside exposing the next weld section. The shield may be shifted about the weld location as it will slide along the hot surface without adhering. Once the weld is completed between two abutting pipe sections, the shield is removed so it can be relocated to the weld area of the next pipe section and another weld bead can be laid down between the next two abutting pipes. The weld shield can be reused. Once a job is completed, the welder removes the shield, and stores it in a convenient place such as a tool box for the next application.

The present invention is particularly useful for preventing sugaring on the inside diameter of the root pass (first weld pass) caused by the displacement of the inert gas by air as the inert gas seeps out from the gap between two abutting pipes. While acting as an effective shield, the present invention does not leave any sticky residue which must be ground off or removed with flammable solvents. Therefore it reduces both material and labor costs when compared to the use of tape. Because the purge strap is reusable it eliminates the expense of purchasing tape which is thrown away after each use. Labor costs are reduced by eliminating sticky residue and the necessity for its removal.

The invented apparatus consists of a purge strap which is configured to wrap about the mating ends of two abutting pipes. It facilitates containment of inert gas within the pipes to be welded together.

Objects of The Invention

The principal object of the invention is to provide a means for containing inert gas between two abutting pipes to inhibit sugaring within the pipes during welding.

It is also an object of the invention to provide a reusable weld shield which can be rolled up and conveniently stored in a worker's toolbox.

Another object of this invention is to provide a shield for pipe welding which will not leave any residue on the pipes.

Another object of this invention is to lower the cost of pipe welding by providing a reusable shield which does not have to be purchased again and again.

A further object of the invention is reduce the consumption of inert gas in the welding of pipes by providing means for containing the gas in the portion of the pipe where it is most effective.

Another object of the invention is to provide a method of welding pipes which will inhibit sugaring on the root pass within the pipes during welding.

BRIEF DESCRIPTION OF THE DRAWINGS

The foregoing and other objects will become more readily apparent by referring to the following detailed description and the appended drawings in which:

FIG. 1 is a cross sectional view of the invented purge strap for use with a small diameter pipe showing a reinforcing member surrounded by a protective coating.

FIG. 2 is a top view or side view of two abutting pipes with tapered ends prepared for welding the pipes together.

FIG. 3 is an isometric view of the invented purge strap as it would appear wrapped, but without the pipe.

FIG. 4 is a cross sectional view of the invented purge strap of FIG. 3.

FIG. 5 is a cross sectional view of a large diameter hinged purge strap showing a hinge and a latch.

FIG. 6 is a cross sectional view of a reinforced inflatable purge strap, including a bulb valve assembly which allows the area between the protective coating and reinforcing member to be filled with air and/or inert gas such as argon for a secure fit about the pipes.

FIG. 7 is a cross sectional view of the inflatable reinforced purge strap of FIG. 6 showing the strap in the inflated mode.

FIG. 16 is an isometric view of an inflatable nonreinforced purge strap having a fastening means, including a bulb valve assembly which allows the area between the protective coatings to be filled with air and/or inert gas such as argon for a secure fit about the pipe.

FIG. 17 is an isometric view of the nonreinforced inflatable purge strap of FIG. 16 having a fastener showing the strap in the inflated mode.

FIG. 18 is an isometric view of a nonreinforced purge strap with a work window as it would be placed about a pipe.

DETAILED DESCRIPTION

Figure 8:
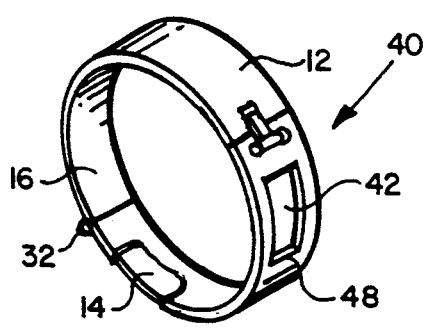
FIG. 8 is an isometric view of a hinged alternative purge strap having a work window, through which the welding procedure is performed.

Referring now to the drawings, and particularly to FIG. 1, the invented purge strap 10 for welding includes a reinforcing member 14 and a protective coating 12 which together comprise the strap body 16. The reinforcing member 14 is spring steel which will bend or curl to assume the circumferential shape of a pipe about which it is placed. Because of the temperatures produced by TIG welding, the purge strap reinforcing member 14 has a high temperature protective coating 12. This coating is advantageously a one component liquid silicone adhesive, preferably GE-RTV TM (Room Temperature Vulcanizing) 159, which is commercially available from General Electric Company, and is approved for use in many construction installations, including use in nuclear facilities. The thickness of this coating should be from about 0.025 to 0.075 inches or greater. A non-asbestos fabric using an aromatic polyamide fiber, preferably NOMEX TM and a liquid silicone having greater than 96% SiO$_2$, preferably SIL-TEMP TM can also be used as a protective coating because of their superior heat resistance. NOMEXv is available for Du Pont de Nemours, E.I. and Co., Inc. and SILTEMPv is available from Janos Industrial Insulation Corp. GE-RTVv can withstand temperatures of up to 700° Fahrenheit while NOMEXv and SIL-TEMPv can withstand temperatures as high as 1000° Fahrenheit.

In use, the strap body 16 is placed around the circumference of two mated and slightly spaced pipes 20 and 22, shown in FIG. 2. Each pipe has a tapered edge 18, these edges form a V-gap 24 into which weld metal is deposited to connect the pipes. Reinforcing member 14, such as spring steel, takes on the shape of the pipes 20 and 22, as shown in FIG. 4, holding the strap body 16 securely in place. The strap body 16 hinders the escape of inert gas from the interior of the pipe through the weld gap 24.

When welding two pipes end to end, the welder positions the pipes 20 and 22 together so there is a slight weld gap 24 between them. A dam, such as the water soluble dam mentioned in Speigel U.S. Pat. No. 3,736,400, is placed in each of the pipes to be welded, to contain the inert gas inside the pipes 20 and 22, at the weld site between the dams. The purge strap 10 is positioned about the pipes 20, 22 so the strap body 16 covers the weld gap 24.. Inert gas is pumped into the pipes through a small opening provided in a dam in one end of the pipe. Argon is the preferred inert gas used with the TIG weld, though other gases can be used. Argon is heavier than air, so as the argon is pumped in, it will displace the air out the top of the pipe.

Figure 10:
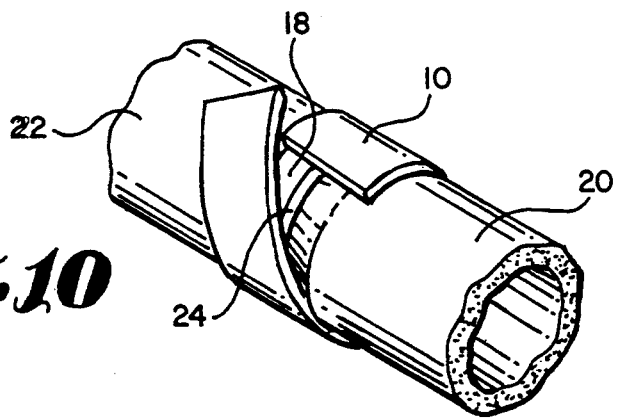
FIG. 10 is an isometric view of two abutting pipes with tapered ends prepared for welding showing the purge strap placed about the pipes with a portion of the strap displaced leaving an exposed work area.

Once the pipes are filled with inert gas in the welding region, the welder moves a portion of the strap body 16 aside as shown in FIG. 10 exposing the weld gap 24. This provides a space through which the welder can work, while still blocking much of the weld gap 24 from seepage of inert gas. The welder proceeds to lay a weld bead between the two pipes where the weld gap is exposed by the displacement of the strap body 16 onto one of the pipes 20, 22. When the weld bead reaches the strap body 16 the welder moves more of the strap body 16 onto a pipe to provide access to additional work space so he can continue to lay down the weld bead. As long as the purge strap 10 is in place about the pipes 20 and 22, the inert gas will remain mostly inside the pipes, with very little seepage to the atmosphere.

The present invention is equally applicable to MIG (Gas Metal Arc Welding) and plasma arc welding as it is to TIG (Tungsten Arc Welding).

Figure 15:
FIG. 15 is an isometric view of a purge strap with a work window having a fastening means as it would be placed about a pipe.

To weld a pipe with a large diameter, a hinged purge strap 30, as shown in FIG. 8, is the preferred embodiment. The hinged purge strap 30 is comprised of a two semi-circular reinforcing means 15 and 17 which are attached by a hinge 32. The ends opposite the hinge are provided with a connecting means 66 which allows the strap to be secured about the pipes. Reinforcing means 14 may have a protective coating 12 or the entire assembly may be made of stainless steel which requires no protective coating. The hinged purge strap is also provided with a work window 42, which provides an aperture for welding. In this configuration it is also possible to have a window flap cover 70, as shown in FIG. 15. The flap cover inhibits escape of the inert gas through the work window 42 when the welder is not welding, by covering the work window. The flap can then be removed or fastened to another part of the strap when welding is to begin.

Figure 11:
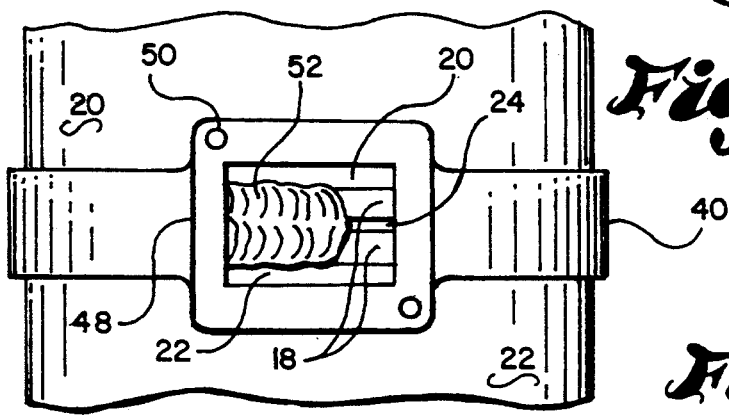
FIG. 11 is a side view of a purge strap with an enlarged work window equipped with nibs or pins, placed about two abutting pipes with a partial weld within the window.

In use, the hinged purge strap is positioned about the pipes. Using the interior dam method described above, inert gas is introduced within the piping. Weld window 42, shown in FIG. 8, provides the welder with a working area through which a weld bead can be laid in the gap 24. Once the weld bead fills the window the welder shifts the position of the window about the pipes 20, 22 to expose more of the weld gap 24. In some applications it may be preferable to equip the purge strap with a larger weld window 78 as shown in FIG. 11. Optional nibs or pins 50 can be molded into the larger frame 48 to provide a grip to facilitate rotation of the strap body 30 about the pipes.

An inflatable purge strap 58, shown in FIG. 6, is configured similarly to the purge strap 10. It is comprised of a reinforcing member 14 and a protective coating 12. A bulb style pump 36, similar to the device used on a sphygmomanometer, is attached to the inflatable strap body 56 by a tube 28. The bulb pump is fitted with a BB valve 38, a thumb wheel valve 44 is attached to the hose 28 and is configured to release the air 26 accumulated in the inflatable strap body 56, as shown in FIG. 7.

In operation, the inflatable strap body 56, in a deflated state as shown in FIG. 6, is placed around the ends of two pipes 20, 22. The reinforcing member 14, such as spring steel, holds the inflatable strap body 56 securely in place. The welder then inflates the inflatable strap body 56 by pumping air or inert gas into it with the bulb pump 36. Once inflated, the strap body 56 of the inflatable purge strap 58 provides a secure seal about the weld gap 24. The welder fills the pipes with inert gas, as above. Then a portion of the inflatable strap body 56 is moved aside, in a fashion similar to FIG. 10, exposing the weld gap 24. This provides a space through which the welder can work, while still blocking most of the weld gap 24 from seepage of inert gas. The welder proceeds to lay a weld bead 52 between the two pipes where the weld gap is exposed by the displacement of the inflatable strap body 56 onto one of the pipes 20, 22. When the bead 52 reaches the inflatable strap body 56 the welder moves more of the inflatable strap body 56 aside onto pipe 20 to provide access to additional work area so he can continue to lay down the weld bead 52. As long as the inflatable purge strap 58 is in place about the pipes 20 and 22 the inert gas will remain mostly inside the pipes, with very little seepage. When the weld is completed, the welder deflates the inflatable strap body 58 by turning the thumb wheel valve 44. The inflatable purge strap 58 can then be removed from the pipe and used in another location or returned to the welder's tool box.

The inflatable purge strap 58 can be provided without a reinforcing member 14 as shown in FIG. 16. In this configuration a protective coating is formed into an airtight tube 74 and connected to a pump 36. Connecting means 72 are provided at both ends of the tube 74. It use is similar to the reinforced inflatable purge strap except the connecting means must remain connected. Therefore moving a section to reveal the weld gap will be slightly different.

Figure 9:
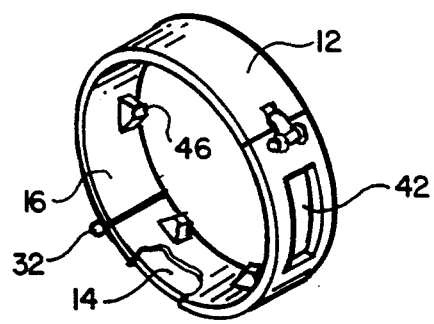
FIG. 9 is an isometric view of another alternative hinged purge strap having small offset protrusions around the interior of the strap which fit into the groove formed between two abutting pipes to insure the strap does not slide when the pipes are vertically arranged for welding.

In another embodiment of the invention, as shown in FIG. 9 a hinged purge strap 45 is provided with offset gap insert positioners 46. The gap insert positioners 46 are offset as shown in FIG. 9 to facilitate both in the alignment of the hinged purge strap and the retention of the purge strap onto pipes which are to be welded with their longitudinal axes in the vertical position. The gap insert positioners 46 rest against the lower of the two abutting pipes 20, 22. In all other respects this embodiment is used in the same way as the hinged purge strap 30.

Figure 12:
FIG. 12 is an isometric view of a nonreinforced purge strap as it would be placed about a pipe.
Figure 13:
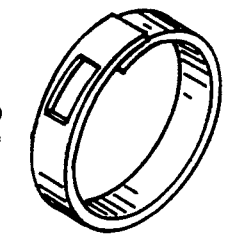
FIG. 13 is an isometric view of a reinforced purge strap with a work window as it would be placed about a pipe.
Figure 14:
FIG. 14 is an isometric view of a purge strap with a work window having a detachable flap as it would be placed about a pipe.

The purge strap 10 alternatively may be configured without a reinforcing means, shown in FIG. 12, as the nonreinforced purge strap 84. This can be molded from GE-RTV 159 TM, NOMEX TM SILTEMP TM or other materials such as a heat resistant rubber or plastic. Nonreinforced purge strap 84 has an elastic 86 or VELCRO closure means 82 like the one shown in FIG. 14, which keeps the strap tight about pipes 20, 22.

In use, the welder positions the nonreinforced purge strap 84 about the pipes 20, 22 and fastens it with the elastic enclosure means 86. Inert gas is then introduced into the pipe. The welder then moves a portion of the nonreinforced purge strap 84 aside from the weld gap 24 and lays down the weld bead 52. As the work area is filled, more of the nonreinforced purge strap is displaced in relationship to the weld gap 24.

The nonreinforced window purge strap 88 shown in FIG. 18, is configured similarly to the nonreinforced purge strap 84 except it has a weld window 42 through which a welder can work. A window flap 70 like the one shown in FIG. 15 can also be provided.

SUMMARY OF THE ACHIEVEMENT OF THE OBJECTS OF THE INVENTION

From the foregoing, it is readily apparent that I have invented an improved method and apparatus for shielding inert gas within two pipes for a TIG weld. By using my apparatus, a welder can connect two steel pipes with a TIG weld faster and more economically than heretofore has been possible while retaining more inert gas inside the steel pipes. The invented purge strap helps to reduce the usage of inert gas as well as reducing sugaring inside of the welded pipes.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. Inert gas shield purge strap apparatus comprising:
   an elongated reinforcing member conformable to the cross-sectional shape of a pipe;
   a high temperature protective coating encasing said reinforcing member; and
   said inert gas shield purge strap apparatus being reusable and re-conformable to many shapes and sizes of pipe.

2. Apparatus according to claim 1 wherein the elongated reinforcing means is provided a frame integral with said elongated reinforcing means providing an opening therethrough.

3. Apparatus according to claim 1 where the reinforcing means is an elongated spring steel strap.

4. Apparatus according to claim 1 wherein the protective coating is a high temperature coating resistant to temperatures of at least 500° F. for at least 30 minutes.

5. Apparatus according to claim 4 wherein the protective coating is a high temperature coating resistant to temperatures of at least 700° F. for at least 30 minutes.

6. Apparatus according to claim 4 where the protective coating is selected from the group consisting of:
   a one component liquid silicon adhesive;
   an asbestos free fabric using an aromatic polyamide fiber; and
   a liquid silicone textile having greater than 90% $SiO_2$.

7. A nonreinforced purge strap apparatus for use in welding pipes having various shapes, comprising:
   a strip of elongated, high temperature resistant, material adaptable to conform to the shape of a pipe;
   a frame provided at one end of said strip of material, said frame having an aperture through which a person may work;
   means for attaching said frame to the other end of said strip of material;
   whereby the frame is slidable about a pipe and said frame provides an aperture through which a person may work.

8. Apparatus according to claim 7 further comprising a flap adapted to cover said opening;
   means for securing said flap to the strap over the opening; and
   means for securing said flap to the strap away from said opening.

9. Inert gas shield purge strap apparatus comprising:
   a pair of semicircular reinforcing means having a given shape;
   said semicircular reinforcing means being longer than they are wide;
   a hinge connecting said semicircular reinforcing means to facilitate placement about a pipe;

a frame integral with a first of said hinged semicircular reinforcing means of said inert gas shield purge strap providing an opening therethrough;

means for attaching said semicircular reinforcing means opposite said hinge; and a molded ridge affixed to the interior of said inert gas shield purge strap.

10. Apparatus according to claim 9 further comprising a flap adapted to cover said opening;

means for securing said flap to the strap over the opening; and means for securing said flap to the strap away from said opening.

11. Apparatus according to claim 9 further comprising at least one nib on said frame to facilitate movement of the frame about said pipe.

12. Apparatus according to claim 9 wherein said purge strap is provided with a protective coating.

13. Apparatus according to claim 12 wherein said protection coating is a high temperature resilient material selected from the group consisting of: plastic, magnetized plastic, and rubber.

14. Inert gas shield purge strap apparatus comprising:

a pair of semicircular reinforcing means having a given shape;

said semicircular reinforcing means being longer than they are wide;

a hinge connecting said semicircular reinforcing means to facilitate placement about a pipe;

a frame integral with a first of said hinged semicircular reinforcing means of said inert gas shield purge strap providing an opening therethrough; and means for attaching said semicircular reinforcing means opposite said hinge;

wherein said purge strap is provided with a protective coating of a high temperature resilient material selected from the group consisting of a one component liquid silicone adhesive, an asbestos free fabric using an aromatic polyamide fiber, and a liquid silicone textile having greater than 90% $SiO_2$.

15. Inflatable inert gas shield purge strap apparatus for use about a exterior circumference of pipes in welding pipes having various shapes, having ends, comprising:

two strips of elongated high temperature resilient material sealed about the perimeter to form a bladder;

a connecting means attached to said bladder;

a valve means connected to said connecting means;

a second connecting means connected to said valve; and a means for inflating said bladder connected to said second connecting means:

whereby, said inflating means introduces gas into said bladder, expanding said bladder; and said valve provides a means for releasing said gas introduced into said bladder.

16. Apparatus according to claim 15 further comprising means for connecting said ends of said inflatable inert gas shield purge strap.

17. An apparatus according to claim 15 further comprising:

reinforcing means inside a bladder adaptable to conform to the shape of a pipe wherein said reinforcing means holds said inflatable inert gas shield purge strap in place about a pipe.

18. Apparatus according to claim 15 wherein said inflating means is selected from the group consisting of: a bulb pump, a hand pump, a foot pump and a compressor.

19. A nonreinforced purge strap apparatus for use in welding pipes having various shapes comprising:

a continuous strip of elongated, high temperature resistant, material adaptable to conform to the shape of a pipe, and having a frame in said strip of material providing an opening therethrough;

whereby said nonreinforced purge strap is securable about a pipe.

20. A nonreinforced purge strap apparatus for use in welding pipes having various shapes comprising:

a strip of elongated, high temperature resistant, material adaptable to conform to the shape of a pipe, said strip of elongated, high temperature resistant, material is selected from the group consisting of: a one component liquid silicone adhesive, an asbestos free fabric using an aromatic polyamide fiber, and a liquid silicone textile having greater than 90% $SiO_2$; and means for attaching one end of said strip to the other end of said strip;

whereby said nonreinforced purge strap is securable about a pipe.

21. A method of welding two pipes end to end, comprising the following steps:

providing inert gas dams;

providing a high temperature-resistant purge strap;

providing a source of inert gas;

inserting dams into each pipe near the end to be welded;

placing a high temperature-resistant purge strap about the pipes covering the end of each so the weld gap is covered;

providing an aperture in the purge straps coverage of the weld gap;

pumping inert gas into the pipes between the dams and the weld strap and displacing air within the pipes with the inert gas;

laying a weld bead into the gap through the aperture in the weld strap; and moving the purge strap around the circumference of the pipes exposing more of the weld gap while completing the weld.

* * * * *

UNITED STATES PATENT AND TRADEMARK OFFICE
CERTIFICATE OF CORRECTION

PATENT NO. : 5,361,972

DATED : November 8, 1994

INVENTOR(S) : Michael R. Barker

Page 1 of 2

It is certified that error appears in the above-identified patent and that said Letters Patent is hereby corrected as shown below:

Column 3, line 10: between "ends" and "are", delete ".".

Column 3, line 13: after ".", delete "the" and insert --The--.

Column 5, line 33: between "silicone" and "having", insert --textile--.

Column 5, line 35: between "NOMEX" and "is", delete "v" and insert --TM--.

Column 5, line 37: between "SILTEMP" and "is", delete "v" and insert --TM-.

UNITED STATES PATENT AND TRADEMARK OFFICE
CERTIFICATE OF CORRECTION

PATENT NO. : 5,361,972
DATED : November 8, 1994
INVENTOR(S) : Michael R. Barker

It is certified that error appears in the above-identified patent and that said Letters Patent is hereby corrected as shown below:

Column 5, line 38: between "GE-RTV" and "can", delete "v" and insert --TM--.

Column 5, line 39: between "NOMEX" and "and", delete "v" and insert --TM--.

Column 5, line 40: between "SILTEMP" and "can", delete "v" and insert --TM--.

Column 5, line 60: between "24" and "inert", delete ".." and insert --.--.

Column 7, line 44: between "NOMEX™" and "SILTEMP™", insert --,--.

Signed and Sealed this

Twenty-ninth Day of May, 2001

NICHOLAS P. GODICI

*Attest:*

*Attesting Officer*        Acting Director of the United States Patent and Trademark Office